United States Patent [19]
Nicolai et al.

[11] Patent Number: 4,645,641
[45] Date of Patent: Feb. 24, 1987

[54] PROCESS AND INSTALLATION TO SECURE A PRESTRESSED CONCRETE PRESSURE VESSEL SURROUNDED BY A REACTOR PROTECTION BUILDING AGAINST EXCESSIVE PRESSURE AND TO PREVENT THE RELEASE OF ACTIVITY TO THE ENVIRONMENT

[75] Inventors: Rainer Nicolai, Hassloch; Winfried Wachholz, Gorxheimertal; Ulrich Weicht, Weinheim, all of Fed. Rep. of Germany

[73] Assignee: Hochtemperatur-Reaktorbau GmbH, Fed. Rep. of Germany

[21] Appl. No.: 780,272

[22] Filed: Sep. 26, 1985

[30] Foreign Application Priority Data
Sep. 26, 1984 [DE] Fed. Rep. of Germany ....... 3435256

[51] Int. Cl.⁴ ............................................... G21C 9/00
[52] U.S. Cl. .................................. 376/283; 376/281; 376/308; 376/310; 376/313; 376/904
[58] Field of Search ............... 376/146, 281, 283, 308, 376/310, 313, 904

[56] References Cited
U.S. PATENT DOCUMENTS
3,105,028 9/1963 Long ................................. 376/310
4,167,444 9/1979 Schweiger ........................ 376/310

FOREIGN PATENT DOCUMENTS
2057405 6/1972 Fed. Rep. of Germany ...... 376/283

Primary Examiner—Deborah L. Kyle
Assistant Examiner—Richard W. Wendtland
Attorney, Agent, or Firm—Robert J. Koch

[57] ABSTRACT

A process and an installation for the securing against excessive pressure in a prestressed concrete pressure vessel of a gas cooled high temperature reactor and for the prevention of activity release into the environment. The process comprises three steps and in each step pressure reducing installations become effective upon the rise of pressure in the prestressed concrete pressure vessel over a predetermined value. In the first step the pressure vessel is relieved by means of the operational gas purification apparatus and a conveying blower into the storage vessels for the cooling gas. In case of a further rise in pressure, in a second step a discharge path equipped with a safety valve and a check valve is opened, which also relieves into the storage vessels while by-passing the gas purification installation. In the third step, if the pressure continues to rise over a predetermined value, a line closed during normal operation by a rupture disk, is open, said line being connected with the discharge path and opening into the air circulation installation of the nuclear reactor plant. The air circulation installation is connected by means of a filter system with an exhaust stack.

16 Claims, 1 Drawing Figure

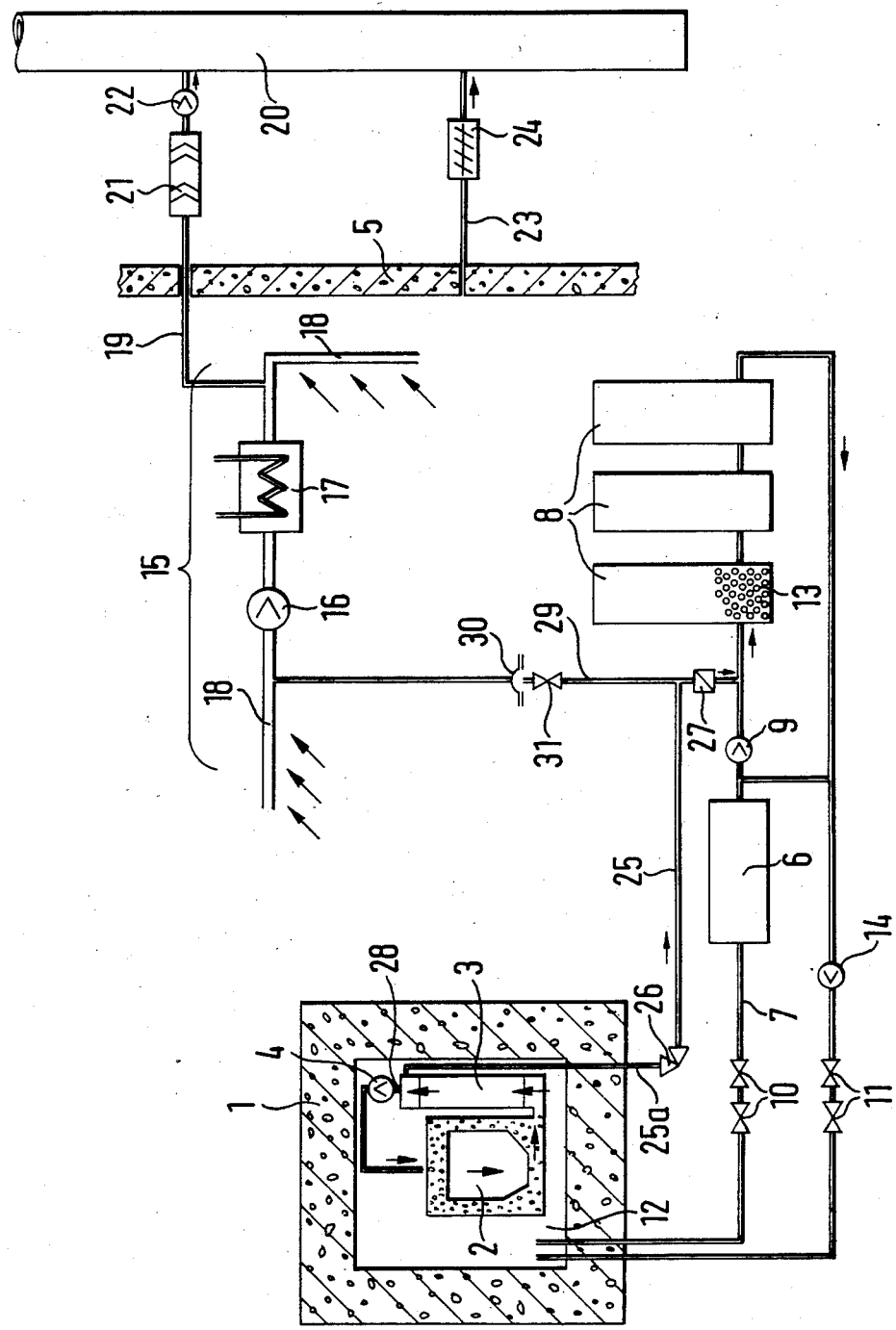

PROCESS AND INSTALLATION TO SECURE A PRESTRESSED CONCRETE PRESSURE VESSEL SURROUNDED BY A REACTOR PROTECTION BUILDING AGAINST EXCESSIVE PRESSURE AND TO PREVENT THE RELEASE OF ACTIVITY TO THE ENVIRONMENT

BACKGROUND OF THE INVENTION

1. Field of the Invention

The invention relates a process and an installation to secure a prestressed concrete pressure vessel for a nuclear reactor plant, surrounded by a protective reactor building, said reactor plant comprising within the prestressed concrete pressure vessel a gas cooled high temperature reactor, steam generators and blowers and being equipped within the reactor protection building with an operational gas purification apparatus and with storage vessels for the cooling gas connected with said purification apparatus, and an air circulation installation connected with an exhaust stack by means of a filter system, to prevent release of radioactivity to the environment.

2. Description of the Prior Art

In a known nuclear power station THTR-300 the cooling gas leakages escaping in normal operation and in the case of minor accidents from the reactor pressure vessel and from radioactive loops are exhausted by means of an air circulation installation comprising an exhaust blower and a filter system to an exhaust stack. In the case of accidents whereby major leakages are released, however, these leakages are exhausted without filtering through the exhaust stack to the environment, as the reactor protection building surrounding the reactor pressure vessel is not laid out for full pressure.

West German Application No. P 32 12 265 shows a process for the planned exhausting of activities from the reactor protection building of a nuclear reactor installation comprising a gas cooled high temperature reactor, said process comprising a discharge path consisting of a filter system, exhaust blower and a stack for cooling gas leakages occurring during normal operations. In order to secure the release of pressure on the reactor protection building even in the case of major cooling gas leakages from the primary loop and to assure the filtered discharge of such leakages to the environment, the known process provides that upon the occurrence of an accident with major cooling gas leakages the normal discharge path is automatically closed by means of a check valve and when a predetermined pressure is exceeded, a second discharge path largely paralleling the first one, is opened automatically or manually. In this second discharge path, installations are provided for the reduction of temperature, the deposition of fission products and the filtering out of gaseous fission products and suspended particles.

SUMMARY OF THE INVENTION

An object of the present invention is to provide a nuclear reactor plant with a process and an apparatus to protect the prestressed concrete pressure vessel with of the installation safely against excessive pressure loads.

According to the invention, when a pressure rise in the prestressed concrete pressure vessel occurs, the pressure vessel is initially relieved by means of the operational gas purification installation and a conveying blower in the storage vessels for the cooling gas. In case of a continuing rise in pressure, until a first predetermined pressure is exceeded, at least one discharge path equipped with a safety valve closed during normal operation and a check valve and leading from the prestressed concrete pressure vessel opens automatically and discharges into storage vessels for the cooling gas, while bypassing the operational gas purification apparatus. If a second predetermined pressure that is higher than said first predetermined pressure is exceeded, the prestressed concrete pressure vessel is relieved by means of a line connected with the discharge path between the safety valve and the check valve and sealed during normal operation by a rupture disk, wherein the discharge of the storage vessels is prevented by the check valve.

The prestressed concrete pressure vessel of a high temperature reactor may be equipped with at least one redundant safety valve, whereby in case of a rise in the primary gas pressure in the prestressed concrete pressure vessel the resulting leakages may be exhausted. The discharge takes place either directly through an exhaust line with a filter system and conveying blower into the exhaust stack, or the safety valve discharges directly into the reactor protection housing wherein the cooling gas is mixed partially with the operating air circulation and subsequently is also conducted through an exhaust filter system to the exhaust stack.

There is a first danger that undiluted hot cooling gas (at approximately 250°–350°) will damage the filter system intended to retain radioactivity, so that cooling gas is able to enter the environment without being filtered. There is a second danger that entire reactor protection building would be exposed to the cooling gas, which makes entering the reactor protection building for repairs impossible.

These disadvantages are eliminated by the process according to the invention. In the process according to the invention the risk that the entire primary loop could be emptied in case of a failure of the safety valve in the open position thereby contributing significantly to the severity of the accident, cannot occur. Also, the cooling gas (helium) escaping through the safety valve is received by the storage vessels and is not lost, so that there is no potential economic loss and extended reactor shutdown times required for reacquisition of cooling gas. As the storage vessels are intended specifically for the reception of the cooling gas and not for the reserve storage, they are always available when the primary loop is full.

As seen from the above, the use of the process according to the invention results in the improved safety of the facility and in a reduction of the residual risk, without the need for additional protective emergency measures.

An apparatus for the embodiment of the process according to the invention is designed so that the safety valve of each discharge path is placed in the immediate vicinity of the prestressed concrete pressure vessel and the part of the conduit between the safety valve and the prestressed concrete pressure vessel is laid out and jacketed in a failure safe manner, so that a failure of this part of the line may be excluded.

The tapping point for each of the discharge paths is located preferably in the primary loop between the outlet of one of the steam generators and the inlet of the associated blower. This yields the advantage that the flow of gas to the safety valve always passes over the gas generator heater surface, whereby the overwhelming majority of the fission products is deposited already in the primary loop onto the relatively cold tubes of the steam generator. Additionally, the gas is being cooled. The discharge path exits from the pressure vessel at the bottom.

The apparatus according to the invention may further be equipped with a shut-off fitting preceding the rupture disk, which in normal operation is locked in the open position. It may be closed manually only and only if a certain minimum pressure is not being attained. It is therefore possible to relcose the primary loop by means of this fitting.

The operating gas purification apparatus of the installation may further be connected with the inside of the prestressed concrete pressure vessel by means of a gas circulation, wherein at least one conveying blower and a plurality of redundantly designed shut-off fittings are arranged, thereby constituting the seal of prestressed concrete pressure vessel.

The air circulating apparatus belonging to the installation comprises advantageously a conveying blower and an air circulation cooler and is connected with the exhaust stack through a discharge path, which comprises in addition to the aforementioned to the aforementioned filter system, a second conveying blower. The line connected with the discharge path enters the air circulation apparatus in front of the air circulation cooler in relation to the flow direction, so that fission products may be deposited on the cooler.

An additional relief facility may be provided parallel to the discharge path for the reactor protection building. This may consist of a discharge line with at least one check valve or louver.

In order to avoid excessive temperature loads on the storage vessels for the cooling gas during the inflow of hot gas (which may be heated to temperatures of up to 500° C.), the storage vessels are appropriately connected in series, with the first vessel containing a pile of heat storage filler bodies. The heat storage filler bodies comprise for example graphite or steel balls. This measure makes it unnecessary to design the storage vessels for elevated temperatures.

BRIEF DESCRIPTION OF THE DRAWING

The process according to the invention will become more apparent from an exemplary embodiment. The FIGURE shows an installation for an embodiment of the process in the form of the flow sheet.

DETAILED DESCRIPTION OF THE PREFERRED EMBODIMENT

A prestressed concrete pressure vessel 1 shown in a longitudinal section comprises a high temperature reactor 2, through the core which heilum is flowing from top to bottom as the cooling gas, together with a plurality of steam generators 3 and the associated blowers 4 (the FIGURE shows only one steam generator and one blower). The prestressed concrete pressure vessel is surrounded by a reactor protection building 5, of which only a part is visible.

An operational gas purification installation 6 is connected to the inside of the prestressed concrete pressure vessel 1 by means of a gas circulation loop 7. Redundant shut-off fittings 10 and 11, and a conveying blower 9 are arranged in the gas loop 7, whereby cooling gas is moved from the primary loop 12 of the high temperature reactor 2 into the storage facility consisting of several vessels 8. The storage vessels 8 are connected in series and the first vessel contains a pile of heat storing filler bodies 13, for example graphite or steel balls. A further conveying blower 14 may be used to transport cooling from the storage vessels 8 into the primary loop 12 as needed.

The gas purification installation 6 and the storage vessels 8 are located within the reactor protection building 5. An air circulating installation 15 comprising a conveying blower 16, an air circulation cooler 17 and a conduit system 18, is also located in the reactor protection building 5. The air circulation system 15 is connected with an exhaust stack 20 by means of the discharge path 19, in which a filter system 21 and a conveying blower 22 are arranged.

A relief line 23 exits from the reactor protection building 5 parallel to the discharge path 19, with a plurality of check valves 24 being installed in said relief line. The relief line 23 also opens into the exhaust stack 20.

Parallel to the gas circulation loop 7 an additional discharge path 25 is provided, with by-passes the gas purification installation 6 and the conveying blower 9, said additional discharge path connecting the inside of the prestressed concrete pressure vessel with the storage vessels 8. A safety valve 26 and a check valve 27 are placed in the discharge path 25. The safety valve 26 is located in the immediate vicinity of the prestressed concrete pressure vessel 1, while the part 25a of line between the prestressed concrete pressure vessel 1 and the safety vessel 26 is protected by jacketing against failure.

The tapping point 28 for the discharge path 25 is located in the primary loop 12 between the outlet of the steam generators 3 and the inlet of the blower 4. The discharge path 25 exist at the bottom from the prestressed concrete pressure vessel 1. The gas flowing to the safety valve 26 is thus always conducted over the heating surface of the steam generators, so that a large part of the fission products may settle already in the primary loop 12 onto the relatively cold steam generator tubes. In addition the gas is already being cooled here.

Between the safety valve 26 and the check valve 27 a line 29 branches off the discharge path 25 and opens into the air circulation installation 15. This opening is located in front of the air circulation cooler 17, so that fission products may be deposited here also. A rupture disk 30 is installed in the line 29, which is preceded by a shut-off fitting 31. The shut-off fitting 31 is locked in the open position in normal operation. It may be closed manually only if a certain predetermined minimum pressure (for example 5 bar) is not being attained.

The operation of the process of the invention shall now be described below.

In the case of an accident in the prestressed concrete pressure vessel 1 leading to a pressure rise in the primary loop 12, initially an attempt is made to relieve the prestressed concrete pressure vessel 1 by way of the gas circulation loop 7 with the operation gas purification installation 6 and the conveyor blower 9 into the storage vessels 8.

If this is not possible because of a failure of certain individual components of the gas purification installation 6 or because the shut-off fittings 10 and 11 remain closed, the safety valve 26 opens when a predetermined pressure is exceeded and relieves the pressure vessel directly into the storage vessels 8 by way of the check valve 27 which is in its open position.

In case of a further rise of the pressure in the prestressed concrete pressure vessel 1, this pressure is secured by means of the rupture disk 30 which permits the flow of the gas into the air circulation installation 15, while the emptying of the already filled storage vessels 8 is prevented by the check valve 27. The response pressure of the safety valve 26 is equal to the design pressure of the prestressed concrete pressure vessel 1; the rupture disk 30 is set higher by approximately 10%, as this pressure is attained in case of hypothetical accidents. The use of a rupture disk 30 in the line 29 is necessary, because its response pressure can be attained only in the case of a long term, total failure of the installations for the removal of the decay heat, which over an extended period of time would lead to damage to the prestressed concrete pressure vessel. In such a case it is appropriate and necessary to extensively lower the pressure of the primary loop in order to prevent the failure under pressure of the prestressed concrete pressure vessel 1. The primary loop 12 may be reclosed by means of the shut-off fitting 31.

If the storage vessels 8 are designed for example for a pressure of approximately 150 to 200 bar, at which they are able to contain all of the cooling gas of the primary loop 12, they have a free volume of about 25 to 33% of the primary loop; i.e. accidents causing a rise in pressure in the primary loop 12 may be controlled without the release of radioactivity by the flow of the cooling gas into the storage vessels.

This in particular involves hypothetical accidents, in which due to the total failure of the installations for the removal of decay heat (decay heat removal systems and the liner cooling system) the primary loop 12 is heated, which necessarily leads to an increase in pressure. In case of cooling gas pressure of for example 50 bar, the safety valve 26 would be set to 55 bar and the rupture disk 30 to 60 bar, so that a potential pressure rise to 1.6 times (60/50×1.33) of the operating pressure may be absorbed by the combined system of the prestressed concrete pressure vessel 1 and the storage vessels 8. It has been found that in case of a primary loop temperature resulting in a pressure rise to 1.6 time the operating pressure the entire decay heat may be removed by the liner cooling system. This insures that accidents extending far into the hypothetical range do not lead to a release of activities into the environment.

In addition, if the safety valve 26 remains open due to failure, this does not have an aggravating effect on the course of the accident, but is of no importance. Finally, the apparatus for the embodiment of the invention allows considerable time during with the decay heat removal systems may be repaired and the gas purification installation 6 may resume its normal function (the pumping of cooling gas into the storage vessels 8 or the return of cooling as from the storage vessels 8 into the prestressed concrete pressure vessel 1.

The faulty opening of the safety value 26 in normal operation also remains without detrimental effects on the nuclear reactor plant, as following a partial reduction of pressure in the primary loop 12 the installation may be shut down in an orderly manner and no fission products are released.

In the extremely unlikely event that both the decay heat removal system and the liner cooling system are inoperational for an extended period of time, the response pressure of the rupture disk 30 may be attained, whereby the prestressed concrete pressure vessel 1 is relieved to a great extent through the air circulation apparatus 15 and the discharge path 19. As mentioned above, the shut-off fitting is locked in the open position during normal operations and may be closed at a certain minimum pressure only.

What is claimed is:

1. An apparatus for securing against excessive pressure in a prestressed concrete pressure vessel surrounded by a reactor protection building in a nuclear reactor installation, wherein within the prestressed concrete pressure vessel is a gas cooled high temperature reactor equipped with a primary cooling loop at least one means for steam generation and steam blower means associated therewith, comprising:
   an air circulation installation within the reactor portection building and connected to an exhaust stack outside the reactor protection building by a filter means for prevention of release of activities to the environment;
   a first means for release of pressure within said pressure vessel when the pressure rises in said pressure vessel made up of means for operational cooling gas purification connected to the prestressed concrete pressure vessel, a first blower means for conveying cooling gas connected to said means for operational gas purification and vessel means for storage for cooling gas connected to said first blower means;
   a second means for release of pressure within said pressure vessel when pressure reaches a first predetermined level, wherein said second means operates to bypass said means for operational cooling gas purification and is made up of at least one secondary discharge path each made up of a normally closed safety valve connected to said pressure vessel and automatically activated when said first predetermined level is reach, and a check valve connected between said safety valve and said vessel means, wherein said safety valve and said check valve make up the secondary discharge path; and
   a third means for release of pressure within said pressure vessel when pressure reaches a second predetermined level, wherein said second predetermined level is higher than said first predetermined level, made up of a normally closed rupture disk means for opening at said second predetermined level connected in a discharge line, wherein said discharge line is connected at a first end to said secondary discharge path between said safety valve and said check valve and at a second end to said air circulation installation wherein said check valve operates to prevent the emptying of cooling gas from said vessel means.

2. An apparatus as in claim 1, wherein the safety valve of each secondary discharge path is placed in immediate vicinity of the prestressed concrete pressure vessel and that a portion of the secondary discharge path between the safety valve and the prestressed concrete pressure vessel is laid out and by jacketing in a failure safe manner.

3. An apparatus as in claim 1, wherein the secondary discharge path is connected to the pressure vessel at the primary loop between an outlet of one of the steam generators and an inlet of the blower means associated therewith.

4. An apparatus as in claim 1, further comprising a shut-off fitting in said discharge line between said rupture disk and said first end wherein, during normal operation said shut-off fitting is locked in the open position.

5. An apparatus as in claim 1, wherein said first means for release of pressure further comprised:
   means for circulating cooling gas with a first end connected the prestressed concrete pressure vessel and a second end connected to an output of the means for operational cooling gas purification and to an output of said vessel means;
   second blower means for conveying cooling gas connected in said means for circulating cooling gas;
   first means for shutting off said first means for release connected between said means for operational cooling gas purification and said pressure vessel; and
   second means for shutting off said first means for release connected between said second blower means and said pressure vessel.

6. An apparatus as in claim 1, wherein said air circulation installation comprises a third means for circulating air connected to the second end of said discharge line blower;
   an air circulation cooled connected to said third blower means;
   a circulation connected to the air circulation cooler leading by way of said filter means a further conveying blower to said exhaust stack; and
   a forth blower mean for conveying air connected between said filter means and said exhaust stack.

7. An apparatus as in claim 6, further comprising:
   relief line means for connecting said reactor protection building to said exhaust stack wherein said relief line means includes at least one check valve or louver.

8. An apparatus as in claim 1, wherein said vessel means further comprises a plurality of containers connected in series and wherein the first container has a pile of heat storing filler bodies such as graphite or steel balls.

9. A method for securing against excessive pressure in a prestressed concrete pressure vessel surrounded by a reactor protection building in a nuclear reactor installation, wherein within the prestressed concrete pressure vessel is a gas cooled high temperature reactor equipped with a primary cooling loop with at least one means for steam generation and steam blower means associated therewith, and an air circulation installation within the reactor protection building and connected to an exhaust stack outside the reactor protection building by a filter means for prevention of release of activities to the environment comprising the steps of:
   an initial release of pressure from said pressure vessel when the pressure rises in said pressure vessel through a first discharge path including a step of operational cooling gas purification, conveying cooling gas from a means for operational gas purification, to vessel means for storage of cooling gas and storing said cooling gas;
   a second step of releasing of pressure within said pressure vessel when pressure reaches a first predetermined level, wherein the second step bypasses the step of operational cooling gas purification by discharging gas through at least one secondary discharge path each made up of a normally closed safety valve connected to said pressure vessel and a check valve connected between said safety valve and said vessel means, including the step of automatically opening the safety valve when the first predetermined pressure level is reached and preventing back flow of cooling gas through the check valve;
   a third step of releasing pressure within said pressure vessel when pressure reaches a second predetermined level, wherein said second predetermined level is higher than said first predetermined level, made up of discharging cooling gas through a discharge line by a normally closed rupture disk in the discharge line at said second predetermined level connected in a discharge line wherein said discharge line is connected at a first end to said secondary discharge path between said safety valve and said check valve and at a second end to said air circulation installation wherein the check valve prevents the emptying of cooling gas from the vessel means.

10. A method as in claim 9, wherein the safety valve of each secondary discharge path is placed in the immediate vicinity of the prestressed concrete pressure vessel and that a portion of the secondary discharge path between the safety valve and the prestressed concrete pressure vessel is laid out and secured by jacketing in a failure safe manner.

11. A method as in claim 9, wherein the secondary discharge path is connected to the pressure vessel at the primary loop between an outlet of one of the steam generators and an inlet of the blower means associated therewith.

12. A method as in claim 9, further comprising the step of locking open a shut-off fitting in the discharge line between the rupture disk and the first end.

13. A method as in claim 9, wherein said first means for release of pressure further comprising of the step of circulating cooling gas of the initial release back to the prestressed concrete pressure vessel both after the operational cooling gas purification and after storage in said vessel means, including the cooling gas to increase the circulating.

14. A method as in claim 9, further comprising the steps of:
   circulating air through an air circulation cooler using a conveying blower within the reactor building;
   upon release of cooling gas through the discharge line conveying cooling gas through the air circulation system, filtering the activity from the cooling gas and conveying the filtered cooling gas to the exhaust stack.

15. A method as in claim 14, further comprising the step of:
   connecting said reactor protection building to said exhaust stack at least one check for discharge of gas from the reactor protection building, and preventing the flow of gas from the exhaust stack to the reactor protection building.

16. A method as in claim 9, including storing the initial discharge cooling gas in a plurality of containers connected in series and dissipating heat in the cooling gas in the first heat storing container with a pile of filler bodies such as graphite or steel balls.

* * * * *